United States Patent Office 2,742,447
Patented Apr. 17, 1956

2,742,447
STABILIZATION OF POLYSULFONE RESINS WITH A BENZIMIDAZOLETHIOL

Robert J. Fanning, Borger, Tex., and Rector P. Louthan, Bartlesville, Okla., assignors to Phillips Petroleum Company, a corporation of Delaware No Drawing. Application November 20, 1952, Serial No. 321,728

12 Claims. (Cl. 260—45.8)

This invention relates to new heteropolymeric resin compositions and their preparation. In one aspect, this invention relates to a method for producing thermally stable polysulfone resins. In another aspect, this invention relates to incorporating benzimidazolethiols in a polysulfone resin. In still another aspect, this invention relates to a polysulfone resin which is resistant to thermal decomposition.

The following objects will be obtained by the aspects of this invention.

It is an object of this invention to provide a method for rendering polysulfone resins resistant to thermal decomposition.

It is another object to provide a thermally stable polysulfone resin composition.

It is still another object to provide a method for producing a thermally stable polysulfone resin.

It is still another object to provide a novel polysulfone latex.

It is still another object to provide a polysulfone resin composition which can be employed in an injection molding operation without causing decomposition of the resin.

Other objects will be apparent to one skilled in the art upon reading the disclosure of this invention.

Polysulfone resins are made by reacting sulfur dioxide with unsaturated organic materials having an olefinic double bond. These resins are characterized by a hard glass-like structure and are important resins where the use of molded articles is indicated.

Polysulfone resins have also been found to be applicable for coating articles such as paper, textiles and the like.

Polysulfone resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as additives for polysulfone resins. These additives include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence.

More recently it has been disclosed that polysulfone resins may be stabilized and rendered highly resistant to thermal decomposition if an organic compound containing at least one sulfhydryl group is incorporated therein as a stabilizing agent. However, we have found that some organic compounds containing a sulfhydryl group have no practical stabilizing effect upon polysulfone resins as indicated by a high weight loss upon being heated. We have found that a polysulfone resin composition containing 2 weight per cent of 5-methoxy-2-benzimidazolethiol is actually more readily decomposed at 375° F. than is an untreated control sample of this polysulfone resin.

We have discovered that polysulfone resins can be rendered resistant to thermal decomposition when certain benzimidazolethiols are incorporated therein as stabilizing agents. When added to a polysulfone resin according to the method of our invention these benzimidazolethiols impart excellent thermal stability to said resins.

According to this invention there is provided a process for the production of thermally stable polysulfone resins which comprises adding to said resin, prior to the molding step, a benzimidazolethiol characterized by the following structural formula

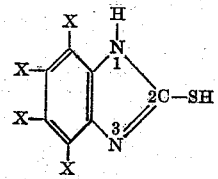

wherein the X's are selected from the group consisting of hydrogen, chlorine, bromine, and alkyl groups containing a total of not more than 10 carbon atoms. The alkyl groups which can be present on the ring are preferably methyl groups although other alkyl groups within the stated limits can be present. Benzimidazolethiols applicable to use in the present invention include 2-benzimidazolethiol, 4-chloro-2-benzimidazolethiol, 5-chloro-2-benzimidazolethiol, 4-methyl-2-benzimidazolethiol, 5-methyl-2-benzimidazolethiol, 4,5-dimethyl-2-benzimidazolethiol, 4,6-dimethyl-2-benzimidazolethiol, 4,7-dimethyl-2-benzimidazolethiol, 5,6-dimethyl-2-benzimidazolethiol, 4-methyl-6-ethyl-2-benzimidazolethiol, 5-methyl-6-tert-butyl-2-benzimidazolethiol, 4-bromo-2-benzimidazolethiol, 5-bromo-2-benzimidazolethiol, 5,6-dichloro-2-benzimidazolethiol, 5-methyl-6-tert-hexyl-2-benzimidazolethiol and 4-bromo-5-methyl-2-benzimidazolethiol.

The benzimidazolethiol stabilizers of our invention are sometimes referred to in the literature as derivatives of thiourea characterized by the structural formula

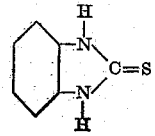

and compounds having such configuration are to be regarded as being within the scope of the present invention.

In order to effect a high degree of stabilization from 0.2 to 10, preferably 0.5 to 5 weight per cent, based on the weight of the resin, of 2-benzimidazolethiol or selected derivative thereof, or mixture of such compounds, is incorporated in the molding composition employed.

The stabilization agents of the present invention can be incorporated into polysulfone resins in a number of ways to accomplish the high degree of thermal stabilization of the present invention. It is important that the compounds be thoroughly and intimately mixed with the resin. Thus, for example, the stabilization agent can be dissolved in methanol, benzene, ethanol, or other suitable solvent and slurried with a dry, powdered, resin and the solvent subsequently removed by evaporation. The stabilization agents of the present invention may also be added in finely-divided form to a aqueous dispersion of the resin in which the latter was prepared and both the resin and stabilizer precipitated therefrom simultaneously. As aqueous dispersion of the stabilization agent can also be added to a neutral latex and both the stabilization agent and resin precipitated therefrom simultaneously to form stabler resin compositions.

The stabilization agents employed in the present invention are applicable to the stabilization of polysulfone resins produced by any method such as emulsion polymerization or polymerization in excess sulfur dioxide or acetone or other suitable solvent. A method for producing said resins by emulsion polymerization is disclosed in copending application Serial No. 8,755, filed February 16, 1948, by W. W. Crouch and E. W. Cotton now Patent No. 2,645,631.

Unsaturated organic compounds which enter into the formation of polysulfone resins comprise those compounds wherein the unsaturation is an olefinic double bond between two adjacent carbon atoms. Such compounds include olefinic hydrocarbons, such as propene, 1-butene, 2-butene, isobutylene, amylenes, hexenes, cyclo-hexenes, heptenes, cyclo-heptenes, octenes, cyclo-octenes, nonenes, decene, undecene, dodecene, etc., diolefins such as butadiene, pentadiene, hexadiene, cyclohexadiene, isoprene, and the like, acetylenes and polyfunctional unsaturated compounds such as allyl alcohol, vinyl acetate, allyl ethyl ether, o-allylanisole, o-allylphenol, p-bromoallyl-benzene, methyl undecylenate, undecylenyl alcohol, undecylenic acid, acrylonitrile, ethyl acrylate, etc. Mixtures of the above compounds can also be reacted with sulfur dioxide to form polysulfone resins.

*Example I*

A polysulfone resin was prepared using the following emulsion recipe in a stainless steel autoclave:

| | Parts by weight |
|---|---|
| Technical 1-butene[1] | 46.7 |
| Sulfur dioxide | 88.3 |
| Water | 220 |
| Ammonium nitrate | 0.5 |
| Maprofix MM[2] | 1.0 |

[1] Contained a minimum of 95 mol per cent of 1-butene.
[2] Sodium laurylsulfate dispersing agent commercially available in the form of a paste containing about 60 per cent solids.

The polymerization was conducted for a period of 4.83 hours at a temperature of 100° F. A conversion of 96.2 per cent was reached.

At the end of the reaction period, excess sulfur dioxide was vented from the reactor. To effect coagulation of the resin, approximately 1 part by weight of 20 wt. per cent aqueous sodium chloride was added to 2 parts of the mixture. This caused a thick cream to be formed. Approximately 1½ parts by weight of water were then added to 1 part of the mixture and the mixture was heated to 125° F. The resin particles were separated from the liquid, washed with water, and dried in air at 130–150° F. for 16 hours.

*Example II*

2-benzimidazolethiol and derivatives thereof as set forth below were dissolved in methanol or benzene and added to samples of powdered resin prepared as described in the foregoing example. After thoroughly commingling the resin and stabilizer solution the solvent was removed by evaporation. The amount of stabilizer applied was equivalent to 1 or 2 weight per cent of the resin, as indicated.

Treated resins and untreated controls were tested for thermal stability in the following manner: Two or three grams of resin was placed in a test tube which was then partially immersed in a constant temperature bath held at 375±2° F. for a total of three hours. Percent loss in weight of the resin was determined at the end of 0.5, 1 and 3 hours. The per cent loss in weight provides a measure of the thermal decomposition which took place. Results of these tests are recorded in the following table:

| Stabilizer | Percent loss in weight at end of x hours heating at 375± 2° F. | | |
|---|---|---|---|
| | 0.5 | 1 | 3 |
| Control | 12.8 | 18.3 | 20.5 |
| 2 wt. percent 2-benzimidazolethiol (added as methanol solution) | 3.5 | 15.2 | 25.1 |
| 1 wt. percent 5-methyl-2-benzimidazolethiol (added as methanol solution) | 3.0 | 12.0 | 19.8 |
| 1 wt. percent 5-chloro-2-benzimidazolethiol (added as methanol solution) | 1.6 | 3.8 | 14.8 |

These data show that 2-benzimidazolethiol and selected derivatives thereof are highly efficacious agents for the thermal stabilization of polysulfone resins.

*Example III*

The following test wherein 5-methoxy-2-benzimidazolethiol was employed as stabilization agent for a polysulfone resin prepared in the manner described above, demonstrates the inoperability of said compound. These data demonstrate that not all organic compounds which contain a sulfhydryl group are efficacious thermal stabilization agents for polysulfone resins.

| Stabilizer | Percent loss in weight at end of x hours heating at 375± 2° F. | | |
|---|---|---|---|
| | 0.5 | 1 | 3 |
| Control | 12.8 | 18.3 | 30.5 |
| 2 wt. percent 5-methoxy-2-benzimidazolethiol | 15.6 | 42.9 | 54.5 |

Reasonable variations and modifications are possible within the scope of the disclosure of the present invention, the essence of which is that 2-benzimidazolethiol and selected derivatives thereof have been found to impart thermal stability to polysulfone resins and polysulfone resins have been so stabilized.

We claim:

1. In the process for producing a polysulfone resin formed by the interaction of sulfur dioxide and an unsaturated organic compound, wherein the unsaturation is a carbon to carbon bond between two adjacent carbon atoms and which will polymerize with sulfur dioxide to form a resin, the improvement which comprises incorporating in said resin 5-chloro-2-benzimidazolethiol.

2. In the process of producing a polysulfone resin formed by the interaction, in aqueous emulsion, of sulfur dioxide and an unsaturated organic compound, wherein the unsaturation is a carbon to carbon bond between two adjacent carbon atoms and which will polymerize with sulfur dioxide to form a resin, the improvement which comprises admixing 5-chloro-2-benzimidazolethiol with the reactants in the emulsion.

3. In the process of producing a polysulfone resin formed by the interaction, in aqueous emulsion, of sulfur dioxide and an unsaturated organic compound, wherein the unsaturation is a carbon to carbon bond between two adjacent carbon atoms and which will polymerize with sulfur dioxide to form a resin, the improvement which comprises admixing 5-chloro-2-benzimidazolethiol with an acid latex of said resin.

4. The process of claim 1 wherein the unsaturated organic compound is an olefin selected from the group consisting of 1-butene, 2-butene, cyclohexene, 1-pentene, and dodecene.

5. The process of claim 1 wherein the unsaturated organic compound is 1-butene.

6. The process of claim 1 wherein the unsaturated organic compound is 2-butene.

7. The process of claim 1 wherein the unsaturated organic compound is cyclohexene.

8. The process of claim 1 wherein the unsaturated organic compound is 1-pentene.

9. The process of claim 1 wherein the unsaturated organic compound is dodecene.

10. A composition comprising a polysulfone resin, formed by the interaction of sulfur dioxide and an unsaturated organic compound wherein the unsaturation is a carbon to carbon bond between adjacent carbon atoms and which will react with sulfur dioxide to form a resin, and 5-chloro-2-benzimidazolethiol.

11. A composition comprising a polysulfone resin, formed by the interaction of sulfur dioxide and an unsaturated organic compound wherein the unsaturation is a carbon to carbon bond between adjacent carbon atoms and which will react with sulfur dioxide to form a resin, and about 0.2 to 10 weight per cent of said resin of 5-chloro-2-benzimidazolethiol.

12. A composition comprising a polysulfone resin, formed by the interaction of sulfur dioxide and an olefin, and about 0.2 to 10 weight per cent of said resin of 5-chloro-2-benzimidazolethiol.

References Cited in the file of this patent

UNITED STATES PATENTS

| | | |
|---|---|---|
| 1,933,962 | Bogemann et al. | Nov. 7, 1933 |
| 2,481,596 | Irany et al. | Sept. 13, 1949 |
| 2,654,726 | Fisher et al. | Oct. 6, 1953 |